Dec. 30, 1924.
P. H. BAKER
COMBINED BOTTLE STOPPER AND POURING SPOUT
Filed Feb. 23, 1924
1,520,845
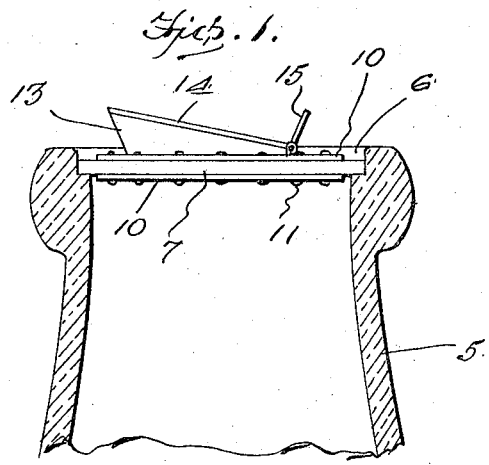
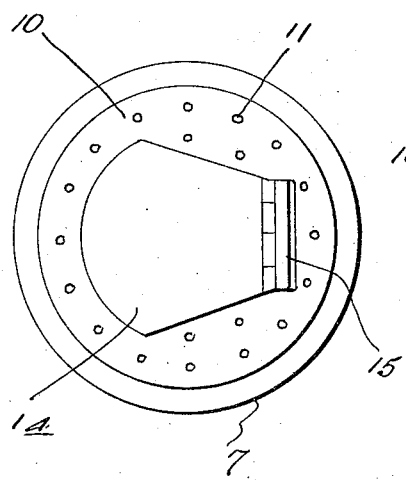
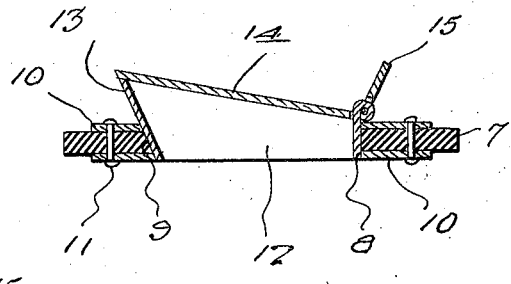
Inventor
P. H. Baker Patented Dec. 30, 1924.

1,520,845

UNITED STATES PATENT OFFICE.

PAUL HERMAN BAKER, OF BLUFFTON, INDIANA.

COMBINED BOTTLE STOPPER AND POURING SPOUT.

Application filed February 23, 1924. Serial No. 694,754.

*To all whom it may concern:*

Be it known that I, PAUL HERMAN BAKER, a citizen of the United States, residing at Bluffton, in the county of Wells and State of Indiana, have invented certain new and useful Improvements in Combined Bottle Stoppers and Pouring Spouts, of which the following is a specification.

This invention relates generally to the art of bottle stoppers and has more particular reference to a bottle stopper specifically adapted for employment in conjunction with the closing of milk bottles, the primary object of the invention residing in the provision of a stopper that is so constructed as to permit the milk to be poured from the bottle without the necessity of removing the stopper from the neck thereof.

An object of the invention is to provide a stopper wherein the same is formed with a filling spout together with a closure therefor, whereby when the milk bottle is set away for further use the access of flies, dirt or other foreign matter to the milk within the bottle will be prevented.

A still further object resides in the provision of a combined milk bottle stopper and pouring spout that may be manufactured and marketed at relatively small cost and one that may be employed for a considerable length of time without the same becoming greatly impaired.

With the foregoing and other objects in view, as the nature of the invention will be better understood, the same comprises the novel form, combination and arrangement of parts hereinafter more fully described, shown in the accompanying drawing and claimed.

In the drawing wherein like reference characters indicate corresponding parts throughout the several views, Figure 1 is a fragmentary sectional view through a milk bottle equipped with a combined stopper and flowing spout constructed in accordance with the present invention, Figure 2 is a top plan view of the article per se, and Figure 3 is a detail transverse cross sectional view thereof.

Now having particular reference to the drawing, 5 indicates a milk bottle the upper end of the neck of which is formed with the usual stopper receiving channel 6.

The present invention constitutes the provision of a disk 7 of hard rubber or other suitable material that is of dimensions substantially equivalent to the dimensions of the well known form of cardboard milk bottle stopper. This disk 7 is formed centrally with a peculiarly shaped opening 8 the front edge of which is inclined as indicated by the reference character 9 in Figure 3.

Disposed upon the opposite faces of said disk 7, are nickel plated brass disks 10—10 of circular shape and being formed with openings to conform with the shape of the opening 9 in said stopper disk 7. These metal disks 10—10 are riveted to each other and to said hard rubber disk 7 through the medium of a desirable number of rivets 11.

Rigidly disposed within the registering openings of the metal disks 10—10 and hard rubber disk 7, is a liquid discharge spout 12 that is formed upon the top side of the stopper thus provided and, at its front end with a pouring nose 13. Hingedly secured to the rear end wall of said spout 12 and upon the top side of the stopper is a closure lid 14 which is of a shape similar to that shown in Figure 2 and that is formed at a point beyond its hinged connection with the spout 12 with an upwardly inclined extension 15 that is to be depressed by the thumb of a person handling the bottle in order that said lid 14 may be raised and the milk consequently poured through the spout 12.

It will thus be seen that I have provided a highly novel, useful and efficient form of combined stopper and pouring spout for milk bottles and one that will not only answer all of the objects above set forth but one that will meet with all of the requirements for a successful commercial use.

Having thus described my invention, what I claim as new and desire to secure by Letters Patent is:—

A bottle stopper comprising a pair of disks of relatively inflexible material and provided at their centers with an opening, a disk of relatively flexible material interposed between the first mentioned disk and provided at its center with an opening which registers with the openings in the first mentioned disk, the flexible disk having a peripheral marginal portion which projects beyond the peripheral edges of the first mentioned disk and a spout member passing through the openings of all of the disks and having a lid hingedly connected thereto.

In testimony whereof I affix my signature.

PAUL HERMAN BAKER.